United States Patent
Brizius et al.

(10) Patent No.: US 8,946,364 B2
(45) Date of Patent: Feb. 3, 2015

(54) SOLUTION PHASE POLYDIACETYLENE SYNTHESIS BY ALKYNE METATHESIS

(75) Inventors: Glen Leon Brizius, Augusta, GA (US); Phillip Kent Montgomery, Arden, NC (US)

(73) Assignee: Empire Technology Development LLC, Wilmington, DE (US)

( * ) Notice: Subject to any disclaimer, the term of this patent is extended or adjusted under 35 U.S.C. 154(b) by 16 days.

(21) Appl. No.: 13/817,008

(22) PCT Filed: Jul. 24, 2012

(86) PCT No.: PCT/US2012/047993
§ 371 (c)(1),
(2), (4) Date: Feb. 14, 2013

(87) PCT Pub. No.: WO2014/018021
PCT Pub. Date: Jan. 30, 2014

(65) Prior Publication Data
US 2014/0031506 A1    Jan. 30, 2014

(51) Int. Cl.
*C08F 4/22*     (2006.01)
*B01J 23/28*    (2006.01)
*B01J 23/30*    (2006.01)
*C08F 138/00*   (2006.01)

(52) U.S. Cl.
USPC ........... 526/169; 526/170; 526/172; 526/142; 526/143; 526/144; 526/285; 556/58; 556/57; 502/156; 502/152

(58) Field of Classification Search
USPC .......................... 526/285, 169, 170, 172, 143
See application file for complete search history.

(56) References Cited

U.S. PATENT DOCUMENTS

| | | | |
|---|---|---|---|
| 6,525,197 B1* | 2/2003 | Furstner et al. | 544/310 |
| 6,967,256 B2* | 11/2005 | Cummins et al. | 556/58 |
| 7,642,541 B2 | 1/2010 | Matsui et al. | |
| 7,989,143 B2 | 8/2011 | Arai et al. | |
| 8,174,181 B2 | 5/2012 | Bawendi et al. | |
| 8,569,208 B1 | 10/2013 | Ribi | |
| 2004/0215028 A1 | 10/2004 | Cummins et al. | |
| 2006/0281938 A1 | 12/2006 | Weissman et al. | |
| 2007/0043188 A1 | 2/2007 | Schaubroeck et al. | |
| 2008/0293905 A9 | 11/2008 | Schaubroeck et al. | |
| 2013/0261295 A1* | 10/2013 | Zhang et al. | 540/145 |
| 2014/0039129 A1* | 2/2014 | Grubbs et al. | 525/357 |

FOREIGN PATENT DOCUMENTS

| | | |
|---|---|---|
| AT | 217857 T | 6/2002 |
| AU | 2003267303 A1 | 4/2004 |
| AU | 2006284134 A1 | 3/2007 |
| CA | 2325370 A1 | 2/1999 |

(Continued)

OTHER PUBLICATIONS

Zhang et al. Organometallics, 2004, 126, 329-335.*

(Continued)

*Primary Examiner* — Rip A. Lee
(74) *Attorney, Agent, or Firm* — Pepper Hamilton LLP

(57) ABSTRACT

The present disclosure provides compositions for alkyne metathesis catalysts and methods for preparing enediynes and alkyne metathesis catalysts. The disclosure also provides methods for catalyzing alkyne metathesis reactions and polymerization of enediyne substrates to polydiacetylenes in solution-phase.

25 Claims, 3 Drawing Sheets

PDA product

(56) References Cited

FOREIGN PATENT DOCUMENTS

| | | | | |
|---|---|---|---|---|
| CA | 2620019 A1 | 3/2007 | | |
| DE | 19804673 A1 | 8/1999 | | |
| EP | 0102925 A2 | 3/1984 | | |
| EP | 0248245 A2 | 12/1987 | | |
| EP | 1053215 B1 | 5/2002 | | |
| EP | 1757613 B1 | 1/2011 | | |
| JP | 2001-131469 A | * | 5/2001 | ........... C09D 165/00 |
| JP | 2004-175764 A | * | 6/2004 | ............... C07F 7/08 |
| JP | 2009504401 A | | 2/2009 | |
| JP | 2009-215441 A | * | 9/2009 | ........... C09D 149/00 |
| WO | WO 99/40047 A1 | 8/1999 | | |
| WO | WO2004/026454 A2 | 4/2004 | | |
| WO | WO2007/022945 A2 | 3/2007 | | |
| ZA | 200802529 A | 4/2009 | | |

OTHER PUBLICATIONS

Zhang, W.; Kraft, S.; Moore, J.S. J. Am. Chem. Soc., 2004, 126, 329-335.*

International Search Report and Written Opinion for PCT/US2012/047993 dated Sep. 28, 2012.

Ahn et al., Fluorogenic Polydiacetylene Supramolecules: Immobilization, Micropatterning, and Application to Label-Free Chemosensors, *Acc. Chem. Res.* (Mar. 19, 2008), 41(7):805-816 (Abstract).

Anderson et al., An Improvement Model for One-Diminsional Polaronic Ferromagnetism: Electrochemically Doped Poly(*m*-phenylenefuchsone), *Advanced Materials* (Jan. 26, 1999), 10(9):688-692 (Abstract).

Aust et al., Oligomere aus gegensinnig angeordneten Chalkon-Bausteinen, *Journal für praktische Chemie* (Aug. 6, 1999), 341(6):523-528 (Abstract).

Bader et al., Liposomes from α,ω-dipolar amphiphiles with a polymerizable diyne moiety in the hydrophobic chain, *Journal of Polymer Science: Polymer Chemistry Edition* (Mar. 11, 2003), 20(6):1623-1628 (Abstract).

Baeyer et al., Ueber Synthesen mittelst des Phenylacetylens und seiner Derivate, *Berichte der deutschen chemischen Gesellschaft* (Jan. 28, 2006), 15(1):57-61 (Abstract).

Bassett, Developments in Crystalline Polymers, Springer, First Edition (Apr. 30, 1982).

Baughman et al., Electron delocalization contribution to single crystal thermal expansion of a 2olydiacetylene, *Journal of Polymer Science: Polymer Physics Edition* (Mar. 11, 2003), 12(11):2189-2193 (Abstract).

Baughman, Solid-state polymerization of diacetylenes, *J. Appl. Phys.* (1972), 43:4362 (Abstract).

Baughman, Solid-state synthesis of large polymer single crystals, *Journal of Polymer Science: Polymer Physics Edition* (Mar. 11, 2003), 12(8):1511-1535 (Abstract).

Baumgarten et al., Nonclassical Conducting Polymers: New Approaches to Organic Metals?, *Chemistry—A European Journal* (Dec. 14, 1998), 4(6):987-989 (Abstract).

Beckahm et al., On the origin of thermochromism in cross-polymerized diacetylene-functionalized polyamides, *Macromolecules* (Sep. 1993), 26(19):5198-5201 (Abstract).

Bloor et al., Polydiacetylenes: Synthesis, structure, and electronic properties, Proceedings of the NATO Advanced Research Workshop on Polydiacetylenes, Stratford-upon-Avon, United Kingdom (Sep. 12-17, 1984), p. 409 (Abstract).

Bravo et al., Circulating and Urinary Catecholamines in Pheochromocytoma—Diagnostic and Pathophysiologic Implications, *N Engl J Med* (Sep. 27, 1979), 301:682-686 (Abstract).

Brizius et al., Increased Activity of in Situ Catalysts for Alkyne Metathesis, *Organic Letters* (Aug. 2, 2002), 4(17):2829-2831.

Brizius et al., Alkyne Metathesis with Simple Catalyst Systems: Efficient Synthesis of Conjugated Polymers Containing Vinyl Groups in Main or Side Chain, *J. Am. Chem. Soc.* (Dec. 2, 2000), 122:12435-12440.

Carpick et al., Spectroscopic Ellipsometry and Fluorescence Study of Thermochromism in an Ultrathin Poly(diacetylene) Film: Reversibility and Transition Kinetics, *Langmuir* (Apr. 7, 2000), 16(10):4639-4647 (Abstract).

Chan et al., Monolayers of Diphenyldiacetylene Derivatives: Tuning Molecular Tilt Angles and Photopolymerization Efficiency via Electrodeposited Ag Interlayer on Au, *J. Phys. Chem. B* (Sep. 22, 2005), 109(41):19161-19168 (Abstract).

Chance, Chromism in Polydiacetylene Solutions and Crystals, *Macromolecules* (Mar. 1980), 13(2):396-398 (Abstract).

Charych et al., Direct colorimetric detection of a receptor-ligand interaction by a polymerized bilayer assembly, *Science* (Jul. 30, 1993), 261(5121):585-588 (Abstract).

Cheng et al., Coupling of an induced fit enzyme to Polydiacetylene thin films: Colorimietric detection of glucose, *Advanced Materials* (Oct. 29, 2004), 9(6):481-483 (Abstract).

Enkelmann et al., Solved and Unsolved Problems in the Solid-State Polymerization of Diacetylenes, *Molecular Crystals and Liquid Crystals* (Oct. 17, 2011), 105(1):011-39 (Abstract).

Enkelmann, Structural Aspects of the Topochemical Polymerization of Diacetylenes, *Advances in Polymer Science* (1984), 63:91-136 (Abstract).

Feast, Synthesis, processing and material properties of conjugated polymers, *Polymer* (Oct. 1996), 37(22):5017-5047 (Abstract).

Fowler et al., A rational design of molecular materials, *Journal of Physical Organic Chemistry* (Nov. 9, 2000), 13(12):850-857 (Abstract).

Fürstner et al., Alkyne metathesis, *Chem. Commun.* (Feb. 28, 2005), pp. 2307-2320.

Giesa et al., Some monomers, oligomers and polymers with conjugated triple bonds, *Makromolekulare Chemie. Macromolecular Symposia* (Mar. 2, 2011), 44(1):1-10 (Abstract).

Grela et al., An Improved Catalyst for Ring-Closing Alkyne Metathesis Based on Molybdenum Hexacarbonyl/2-Fluorophenol, *Org. Lett.* (Sep. 27, 2002), 4(21):3747-3749 (Abstract).

Hobbs et al., Synthesis of Polymerized Thin Films for Immobilized Ligand Display in Proteomic Analysis, *Bioconjugate Chem.* (Mar. 20, 2003), 14(3):526-531 (Abstract).

Holmes et al., Improved assay for plasma dihydroxyphenylacetic acid and other catechols using high-performance liquid chromatography with electrochemical detection, *Journal of Chromatography B: Biomedical Sciences and Applications* (Mar. 4, 1994), 653(2):131-138 (Abstract).

Jahnke et al., Functional, Hierarchically Structured Poly(diacetylene)s via Supramolecular Self-Assembly, *Macromolecular Bioscience* (Feb. 13, 2007), 7(2):136-143 (Abstract).

Jelinek et al., Polymerized lipid vesicles as colorimetric biosensors for biotechnological applications, *Biotechnology Advances* (Apr. 1, 2001), 19(2):109-118 (Abstract).

Ji et al., The Fluorescent Polydiacetylene Liposome, *Bull. Korean Chem. Soc.* (2003), 24(5):667-670.

Kane et al., Preparation of layered diacetylenes as a demonstration of strategies for supramolecular synthesis, *J. Am. Chem. Soc.* (Dec. 1995), 117(48):12003-12004 (Abstract).

Kim et al., Unique Effects of Cyclodextrins on the Formation and Colorimetric Transition of Polydiacetylene Vesicles, *Macromolecular Chemistry and Physics* (Nov. 3, 2005), 206(22):2299-2306 (Abstract).

Kim et al., Self-Assembled Spin-Coated and Bulk Films of a Novel Poly(diacetylene) as Second-Order Nonlinear Optical Polymers, *Macromolecules* (Jan. 1995), 28(2):642-647 (Abstract).

Kim et al., Immobilized Polydiacetylene Vesicles on Solid Substrates for Use as Chemosensors, *Advanced Materials* (Jun. 30, 2003), 15(13):1118-1121 (Abstract).

Kim et al., Rational Design and in-Situ FTIR Analyses of Colorimetrically Reversibe Polydiacetylene Supramolecules, *Macromolecules* (Oct. 7, 2005), 38(22):9366-9376 (Abstract).

Kim et al., A Polydiacetylene-Based Fluorescent Sensor Chip, *J. Am. Chem. Soc.* (Nov. 30, 2005), 127(50):17580-17581 (Abstract).

Kolusheva et al., Biomimetic lipid/polymer colorimetric membranes, molecular and cooperative properties, *Journal of Lipid Research* (Oct. 16, 2002), 44:65-71 (Abstract).

Kolusheva et al., Cation-Selective Color Sensors Composed of Ionophore-Phospholipid-Polydiacetylene Mixed Vesicles, *J. Am. Chem. Soc.* (Jan. 22, 2000), 122(5):776-780 (Abstract).

(56) References Cited

OTHER PUBLICATIONS

Kolusheva et al., Selective Detection of Catecholamines by Synthetic Receptors Embedded in Chromatic Polydiacetylene Vesicles, *J. Am. Chem. Soc.* (Jun. 22, 2005), 127(28):10000-10001 (Abstract).

Kuo et al., Synthesis and properties of diacetylenic glutamate lipid monomer and polymer: thermochromic polydiacetylene free-standing films, *Macromolecules* (Jun. 1990), 23(13):3225-3230 (Abstract).

Kurata et al., Alkali Metal Reduction of Oligo-6-(2-thienyl)pentafulvenes. Synthesis of Oligothienylenemethines Attached with Cyclopentadienide Groups, *Chemistry Letters* (1994), 23(12):2219-2222 (Abstract).

Kurata et al., Oligo(p-quinone methide)s bridged with thiophene rings. Novel oligomeric, quinonoid π-systems with high electron affinity, *Tetrahedron Letters* (Dec. 22, 1997), 38(51):8875-8878 (Abstract).

Lando et al., Synthesis and characterization of a conducting polyfunctional polydiacetylene, *Synthetic Metals* (1984), 9(2):317-327 (Abstract).

Londergan et al., Ruthenium Catalyzed Synthesis of Cross-Conjugated Polymers and Related Hyperbranched Materials. Copoly(arylene/1,1-vinylene)s, *Macromolecules* (Apr. 17, 1998), 31(9):2784-2788 (Abstract).

Lopez et al., Structural effects on the photopolymerization of bilayer membranes, *J. Am. Chem. Soc.* (Jan. 1982), 104(1):305-307 (Abstract).

Lu et al., Self-assembly of mesoscopically ordered chromatic polydiacetylene/silica nanocomposite, *Nature* (Apr. 19, 2001), 410:913-917 (Abstract).

Lu et al., Catenation of Heterocyclic Non-Kekulé Biradicals to Tetraradical Prototypes of Conductive or Magnetic Polymers, *J. Am. Chem. Soc.* (Feb. 12, 1997), 119(6):1428-1438 (Abstract).

Ma et al., Self-Assembly Combined with Photopolymerization for the Fabrication of Fluorescence "Turn-On" Vesicle Sensors with Reversible On-Off Switching Properties, *Adv. Mater.* (2006), 18:55-60 (Abstract).

Mao et al., Cross-conjugated polymers via condensation of a zirconocene alkynyl (benzyne) derivative generated by thermolysis of $Cp_2ZrMe(C_6H_4C CSiMe_3)$, *Journal of Organometallic Chemistry* (Aug. 23, 1996), 521(1-2):425-428 (Abstract).

Meier et al., Oligomere aus gleichsinnig angeordneten Chalkon-Bausteinen, *Journal für praktische Chemie* (Jun. 29, 1999), 341(5):466-471 (Abstract).

Meier et al., Konvergenz von Absorption and Fluoreszenz bei gekreuzt konjugierten Oligomeren aus Chalkon-Bausteinen, *Journal für praktische Chemie* (Aug. 6, 1999), 341(6):529-535 (Abstract).

Melveger et al., Raman spectral changes during the solid-state polymerization of diacetylenes, *Journal of Polymer Science: Polymer Physics Edition* (Mar. 11, 2003), 11(4):603-619 (Abstract).

Okada et al., Prearation and Nonlinear Optical Property of Polydiacetylenes from Unsymmetrical Diphenylbutadiynes with Trifloromethyl Substituents, *Molecular Crystals and Liquid Crystals Incorporating Nonlinear Optics* (Oct. 4, 2006), 183(1):81-90 (Abstract).

Okada et al., Color and Chromism of Polydiacetylene Vesicles, *Acc. Chem. Res.* (May 2, 1998), 31(5):229-239 (Abstract).

Orynbayeva et al., Visualization of Membrane Processes in Living Cells by Surface-Attached Chromatic Polymer Patches, *Angewandte Chemie International Edition* (Jan. 10, 2005), 44(7):1092-1096 (Abstract).

Pan et al., Molecular Recognition and Colorimetric Detection of Cholera Toxin by Poly(diacetylene) Liposomes Incorporating $G_{m1}$ Ganglioside, *Langmuir* (Mar. 19, 1997), 13(6):1365-1367 (Abstract).

Patel et al., Solid state phase transformation of a diacetylene by solvation. Crystal structure of a moderately reactive monomer form, *J. Am. Chem. Soc.* (Jan. 1980), 102(2):461-466 (Abstract).

Peachey et al., Energetics of Organic Solid-State Reactions: Piezomodulated Raman Spectroscopy, Modal Motion, and Anaharmonicity in the 2,5-Distyrylpyrazine (DSP) Photoreaction, *J. Phys. Chem.* (Jul. 1994), 98(29):7106-7115 (Abstract).

Peter et al., Stereospecific syntheses fo cis- and trans-1,6-bistrimethylsilyl-hex-3-ene-1,5-diyne, *Tetrahedron Letters* (1985), 26(6):709-712 (Abstract).

Sarkar et al., Novel polydiacetylenes for optical materials: beyond the conventional polydiacetylenes, *Journal of Materials Chemistry* (Mar. 6, 2000), 10(4):819-828 (Abstract).

Schott et al., Nonlinear Optical Properties of Organic Molecules and Crystals, vol. 2, Chapter III-1 (1987), pp. 3-49.

Selde, The Synthesis of a Polydiacetylene to Create a Novel Sensory Material, A Thesis Submitted to the Faculty of the Graduate School at The University of North Carolina at Greensboro in Partial Fulfillment of the Requirements for the Degree Master of Science (2007), pp. 1-47.

Son et al., Synthesis and Characterization of Linear Siloxane-Diacetylene Polymers, *Macromolecules* (Jan. 1995), 28(1):399-400 (Abstract).

Spevak et al., Polymerized liposomes containing C-glycosides of sialic acid: potent inhibitors of influenza virus in vitro infectivity, *J. Am. Chem. Soc.* (Feb. 1993), 115(3):1146-1147 (Abstract).

Sun et al., Preparation of Poly(diiododiacetylene), an Ordered Conjugated Polymer of Carbon and Iodine, *Science* (May 19, 2006), 312(5776):1030-1034 (Abstract).

Swager, The Molecular Wire Approach to Sensory Signal Amplification, *Acc. Chem. Res.* (1998), 31(5):201-207.

Tamm et al., Development of alkyne metathesis catalysts, it's a game of give and take, *chimica oggi/Chemistry Today* (Jan.-Feb. 2010), 28(1):60-63.

Tanaka et al., Structural and morphological study of a melt-crystallized polydiacetylene, *Macromolecules* (May 1989), 22(5):2427-2432 (Abstract).

Tashiro et al., First Success in Direct Analysis of Microscopic Deformation Mechanism of Polydiacetylene Single Crystal by the X-ray Imaging-Plate System, *Macromolecules* (Dec. 2, 1996), 29(25):8188-8196 (Abstract).

Tieke et al., Polymerization of diacetylenes in multilayers, *Journal of Polymer Science: Polymer Chemistry Edition* (Mar. 11, 2003), 17(6):1631-1644 (Abstract).

Wang et al., Lyotropic liquid crystals of soluble polydiacetylene. A comparative investigation by means of optical and electron microscopy, *Liquid Crystals* (Sep. 24, 2006), 15(1):1-24 (Abstract).

Wang et al., Colorimetric detection of oligonucleotides using a polydiacetylene vesicle sensor, *Anal Bioanal Chem.* (Aug. 2005), 382(7):1708-1710 (Abstract).

Wang et al., Synthesis and properties of Chiral Self-Assembling Lamelar Polydiacetylene Systems with Very-Long-Range Order, *Langmuir* (Apr. 1, 1999), 15(9):3062-3069 (Abstract).

Wegner, Topochemical polymerization of monomers with conjugated triple bonds, *Die Makromolekulare Chemie* (Apr. 1972), 154(1):35-48 (Abstract).

Wu et al., Recent advances in the development of alkyne metathesis catalysts, *Beilstein J. Org. Chem.* (Jan. 18, 2011), 7:82-93.

Xu et al., Syntheses and optical properties of conjugated polymers containing cross-conjugated oxadiazole units, *Synthetic Metals* (2000), 114:337-345.

Yang et al., Drift velocity measurements in thin film polydiacetylene single crystals, *Sold State Communications* (Mar. 1991), 77(10):763-765 (Abstract).

Yang et al., Polydiacetylene Liposome Arrays for Selective Potassium Detection, *J. Am. Chem. Soc.* (Mar. 19, 2008), 130(15):5010-5011 (Abstract).

Yang et al., Photoinduced charge-carrier generation and transport in thin-film Polydiacetylene single crystals, *Synthetic Metals* (Aug. 15, 1992), 50(1-3):439-449 (Abstract).

Yee et al., Synthesis and properties of a new Polydiacetylene: Poly [1,6-di(N-carbazolyl)-2,4-hexadiyne], *Journal of Polymer Science: Polymer Chemistry Edition* (1978), 16(3):431-441 (Abstract).

Yoon et al., Colorimetric Sensors for Volatile Organic Compounds (VOCs) Based on Conjugated Polymer-Embedded Electrospun Fibers, *J. Am. Chem. Soc.* (Feb. 23, 2007), 129(11):3038-3039 (Abstract).

\* cited by examiner

SOLUTION PHASE POLYDIACETYLENE SYNTHESIS BY ALKYNE METATHESIS

CLAIM OF PRIORITY

This application is a U.S. national stage filing under 35 U.S.C. §371 of International Application No. PCT/US2012/47993 filed on Jul. 24, 2012 and entitled "Solution Phase Polydiacetylene Synthesis by Alkyne Metathesis," which is incorporated herein by reference in its entirety.

BACKGROUND

Conjugated organic polymers, due to the delocalization of π-electrons, exhibit attractive optical and nonlinear optical properties and there is considerable interest in development of efficient sensors and sensing matrices utilizing such conjugated polymers. An example of this class of polymers is polydiacetylenes (PDAs). PDA-based sensors are intensely investigated due to their unique color changing properties upon stimulation. For example, when PDAs are exposed to thermal or mechanical stress, the polymers undergo a change in color from blue to red. Although not fully understood, it is widely accepted that this change in color is brought about by the conformational changes in the PDA backbone. Thus, the dark blue color of the polymers gradually shifts to red color depending on the amount of the stress exposed. This colorimetric property of PDAs has been exploited for making PDA-based sensors to detect changes in temperature, pH, ions, solvents, volatile organic compounds (VOCs), ligand-receptor interactions and the like.

Although PDAs are valuable for the development of a wide range of embedded sensors, there exists a problem in the synthesis of PDAs. Current diacetylene polymerization conditions include heating to high temperatures, at which most organics decompose, or exposing to high intensity UV, X-ray and γ-ray irradiations. Many of these methods fail to produce good yields of high purity PDAs due to limitations such as failure of reactions to undergo completion, decomposition of polymers during the polymerization and most critically, imperfect alignment of the monomers in the solid state prepolymerization. It is often noticed that the newly synthesized polymer materials are damaged due to side chain breaks as a result of UV or gamma-ray irradiation. The current synthesis of PDAs through solid-state processes often produces poor yields due to irregular conjugated backbones. Thus, an efficient and simple synthesis of PDAs suitable for large scale production is desired.

SUMMARY

The present disclosure is directed to catalyst compositions for alkyne metathesis reactions and methods for synthesizing PDAs in a solution-phase using such catalysts. In an embodiment, a catalyst for alkyne metathesis reaction is of the following structure:

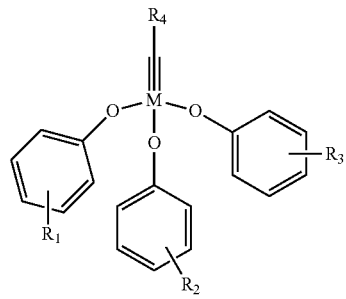

wherein M is molybdenum or tungsten; $R_1$, $R_2$, and $R_3$ are, independently, a perfluoroalkyl group represented by the formula $-(CF_2)_nF$; n is an integer from 1 to 24; and $R_4$ is an alkyl or a heteroalkyl group.

In an embodiment, a method for preparing a catalyst involves heating a reaction mixture comprising a transition metal compound, a perfluoroalkyl phenol, and an alkyne in a reaction vessel, and removing the alkyne by purging with an inert gas.

In an embodiment, a method of preparing a polydiacetylene involves providing at least one enediyne substrate and at least one catalyst, and performing a metathesis reaction with the enediyne and the catalyst in a reaction vessel to produce the polydiacetylenes.

DETAILED DESCRIPTION

Figure 1:
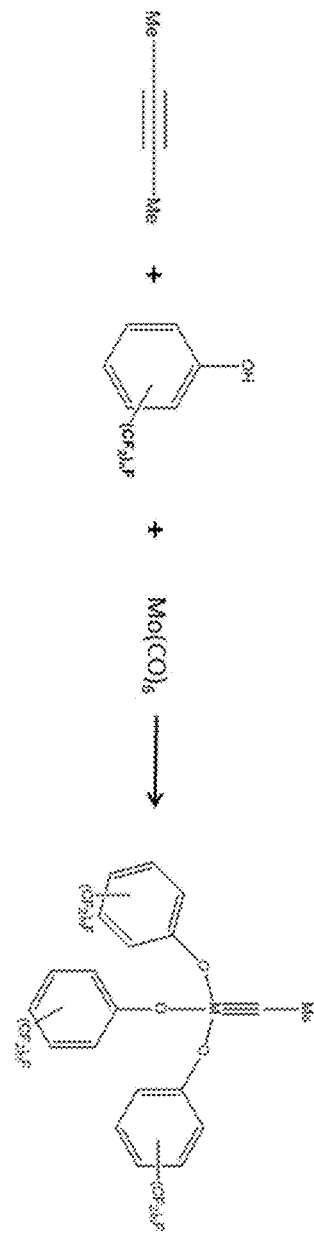
FIG. 1 depicts a method for preparing an alkyne metathesis catalyst according to an embodiment.

The polymerization of diacetylene monomers using solid-state processes is not always feasible due to the lack of correct alignment between the monomers. The difficulty of polymerization increases as the area of the polymerizing surface increases. Further, the requirements for the proper design of a monomer, the choice of monomer crystallization, and the choice of polymerization are quite stringent. For example, the synthesis of phenyl-substituted PDAs, although highly desirable for their predicted strong nonlinear optic properties, is seldom reported. This is due to the steric hindrance generated by the phenyl group that prevents proper alignment of the monomers for the 1,4 topochemical solid-state polymerization. Further, the number of π-electrons per repeat unit increases through π-conjugation between the backbone and the side. In addition, formation of PDAs by alternate methods, such as palladium-catalyzed $sp^2$-sp coupling also has limitations. Various reports demonstrate that coupling terminal alkynes to dichloroethylene via $sp^2$-sp coupling method results in small but significant amounts of impurities. Hence, it is desired to synthesize PDAs of wide scope in terms of side chain substitution using simple, inexpensive chemistry. The present disclosure is directed to synthesis of PDAs in solution-phase by alkyne metathesis reactions.

Alkyne metathesis refers to a mutual exchange of alkylidyne units between a pair of (non-terminal) acetylene derivatives. The metathesis catalyst catalyzes the cleavage of two carbon-carbon triple bonds (C≡C) to provide four fragments that rejoin with a new partner. Thus, two starting alkynes (X≡Y) each having an X and a Y group undergo metathesis to provide a first product alkyne having two X's (X≡X) and a second product alkyne having two Y's (Y≡Y). Because metathesis is an equilibrium reaction, removal of one of the alkynes, X≡X for example, as the reaction proceeds, such as through precipitation or vaporization, may provide the other alkyne, Y≡Y for example, as the major product of the reaction. To date only a limited number of species are known to catalyze alkyne metathesis reactions efficiently, despite the high potential for the application of alkyne metathesis in areas such as organic synthesis, pharmaceuticals and materials science. Therefore, the development of new alkyne metathesis catalysts with high efficiencies and adequate functional group tolerance is still an important target. Some of the widely used catalysts for alkyne metathesis are the Mortreux system catalysts, the Schrock system catalysts and Cummins-Fürstner-Moore system catalysts. Mortreux system catalysts consists of two components—Mo(CO)$_6$ and phenol additives heated in high boiling solvents. Since the active species generated in situ are unknown, this catalytic system is considered as ill-defined, preventing a rational catalyst design and improvement. Although, these Mo-based systems are currently widely used for alkyne metathesis reactions due to their ease of application, cheap and commercial availability, the rather harsh conditions required and the low activity preclude its use with sensitive moieties. The Schrock system catalysts are high oxidation state molybdenum or tungsten alkylidyne complexes which form metallacyclobutadienes upon treatment with internal alkynes. However, the use of these catalysts requires elevated temperatures and high catalyst loadings, as well as handling in inert atmospheres, such as a glovebox. The Cummins-Fürstner-Moore system catalysts involve activating molybdenum triamido complexes with dichloromethane to produce active catalyst species.

Previous work demonstrated the dimerization of an eneyne using an alkyne metathesis system of Mo(CO)$_6$, 4-chlorophenol, and 3-hexyne that resulted in about 80% yield. However, this approach could not be used to synthesize high yield PDAs from difunctional monomers. The present disclosure describes modification of the "preactivated" Mori-type alkyne metathesis system by using a perfluoroalkylated phenol instead of 4-chlorophenol. Disclosed herein are new, simple, solution-phase synthesis of high quality PDAs by the polymerization of difunctional monomers.

This disclosure is not limited to the particular systems, devices and methods described, as these may vary. The terminology used in the description is for the purpose of describing the particular versions or embodiments only, and is not intended to limit the scope.

"Alkyl" refers to monovalent saturated aliphatic hydrocarbyl groups having from 1 to 20 carbon atoms and preferably 1 to 10 carbon atoms. This term includes, by way of example, linear and branched hydrocarbyl groups such as methyl (—CH$_3$), ethyl (—CH$_2$CH$_3$), n-propyl (—CH$_2$CH$_2$CH$_3$—), isopropyl ((CH$_3$)$_2$CH—), n-butyl (CH$_3$CH$_2$CH$_2$CH$_2$—), isobutyl ((CH$_3$)$_2$CHCH$_2$—), sec-butyl ((CH$_3$)(CH$_3$CH$_2$)CH—) and t-butyl ((CH$_3$)$_3$C—).

"Aryl" refers to a aromatic carbocyclic group of from 5 to 14 carbon atoms having a single ring (e.g., benzo) or multiple condensed rings (e.g., naphthyl or anthryl) which condensed rings may or may not be aromatic.

"Heteroaryl" refers to an aromatic group that contains at least one heteroatom selected from the group consisting of oxygen, nitrogen and sulfur within the ring. Such heteroaryl groups can have a single ring (e.g., pyridinyl or furyl) or multiple condensed rings (e.g., indolizinyl or benzothienyl) wherein the condensed rings may or may not be aromatic and/or contain a heteroatom.

"Alkoxy" refers to the group —O-alkyl wherein alkyl is defined herein. Alkoxy includes, by way of example, methoxy, ethoxy, n-propoxy, isopropoxy, n-butoxy, t-butoxy, sec-butoxy, and n-pentoxy.

"Heteroalkyl" refers to alkyl groups in which one or more skeletal atoms are oxygen, nitrogen, sulfur or combinations thereof.

As used herein, the phrase "integer from 1 to 24" means 1, 2, 3, 4, 5, 6, 7, 8, 9, 10, 11, 12, 13, 14, 15, 16, 17, 18, 19, 20, 21, 22, 23 or 24.

The present disclosure describes catalyst compositions for alkyne metathesis reactions and methods for synthesizing PDAs in a solution-phase using such catalysts. In some embodiments, the catalyst for a metathesis reaction may be of the formula (I):

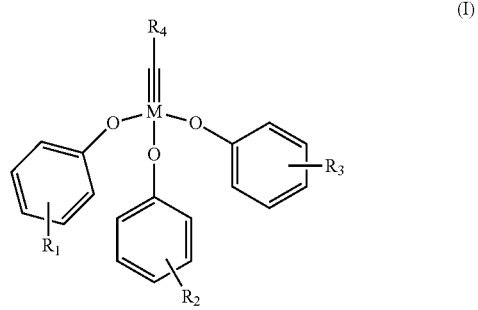

(I)

wherein M is molybdenum or tungsten; $R_1$, $R_2$, and $R_3$ are, independently, a perfluoroalkyl group represented by the formula —(CF$_2$)$_n$F; n is an integer from 1 to 24; F represents fluorine and $R_4$ is an alkyl or a heteroalkyl group. In some embodiments, $R_4$ may be a methyl group, an ethyl group, a propyl group, a n-butyl group, an iso-butyl group, a pentyl group, a hexyl group, a heptyl, or an octyl group.

In some embodiments, the perfluoroalkyl phenol group in the structure (I) may be perfluorohexyl phenol, perfluorooctyl phenol, perfluoropentyl phenol, perfluorooctyl n-propyl phenol, perfluorododecyl phenol or perfluoromethyldecyl phenol or a combination thereof. Examples of perfluoroalkyl phenol include, but are not limited to, 4-perfluorooctyl phenol, 4-perfluorododecyl phenol and 4-perfluorohexyl phenol.

Methods for preparing alkyne metathesis catalyst are provided. FIG. 1 illustrates one such embodiment. The method may involve heating a reaction mixture comprising a transition metal compound, a perfluoroalkyl phenol, and an alkyne in a reaction vessel, and then removing the excess alkyne by purging with an inert gas. The transition metal compounds used in the reaction mixture may be a molybdenum compound or a tungsten compound. Examples of molybdenum and tungsten compounds that may be used include, but are not limited to, Mo(CO)$_6$, MoO$_2$, MoO$_3$/SiO$_2$, W(CO)$_6$ and WO$_3$/SiO$_2$.

The perfluoroalkyl phenol used in the reaction mixture may be any one of the perfluoroalkyl phenols described herein. Acidic phenols such as perfluoroalkyl phenols are more reactive than the less-acidic phenols in these reactions. Further, any number of different stereoisomers of perfluoroalkyl phenols may be used in the reaction. The perfluoroalkyl phenol may be represented by the following structure (II):

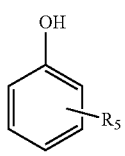

(II)

wherein $R_5$ is represented by the formula —$(CF_2)_nF$, wherein n is an integer from 1 to 24 and F represents fluorine. Examples of perfluoroalkyl phenols may include perfluorohexyl phenol, perfluorooctyl phenol, perfluoropentyl phenol, perfluorooctyl n-propyl phenol, perfluorododecyl phenol and perfluoro methyldecyl phenol. Perfluoroalkyl phenol dissolved in o-dichlorobenzene may be used.

In additional embodiments, the alkyne used in the reaction mixture may be 2-butyne or 2-pentyne. The use of 2-butyne may result in formation of less desirable by-products that can impede the reaction process. Further, due to its low boiling point, excess 2-butyne may be present in gaseous phase in the reaction vessel, and may facilitate easy removal.

In other embodiments, the reaction involves heating a mixture of a metal compound, a perfluoroalkyl phenol, and an alkyne. For example, the metal compound, perfluoroalkyl phenol and alkyne may be mixed in a molar ratio of about 0.1:1:1 to about 0.25:5:10, about 0.1:1:1 to about 0.1:3:3, about 0.1:1:1 to about 0.25:5:5, about 0.1:1:1 to about 0.25:3:10. Specific examples include about 0.1:1:1, about 0.1:3:3, about 0.2:2:2, about 0.25:5:10 and ranges between any two of these values. Further, the reaction mixture may be heated to a temperature of about 80° C. to about 150° C., about 90° C. to about 150° C., about 100° C. to about 150° C., or about 120° C. to about 150° C. Specific examples include about 80° C., about 90° C., about 95° C., about 100° C., about 110° C., about 120° C., about 125° C., about 130° C., about 140° C., about 150° C. and ranges between any two of these values. The heating may be performed for about 30 minutes to about 48 hours, for about 1 hour to about 48 hours, for about 5 hours to about 48 hours, for about 10 hours to about 48 hours, for about 24 hours to about 48 hours. Specific examples include about 30 minutes, about 2 hours, about 4 hours, about 8 hours, about 12 hours, about 24 hours, about 48 hours and ranges between any two of these values.

In general, the reaction may be performed in any reaction vessel. The reaction vessel may be a tube, flask, cylinder, container, tank and the like. The reaction vessel may further contain an inlet port to allow an inert gas to enter into the reaction vessel. The reaction vessel may also contain an outlet port to allow excess alkyne to leave the reaction vessel. During the reaction, the excess alkyne may be removed by purging an inert gas through the reaction mixture during the reaction process. Examples of inert gas that may be used are nitrogen, argon, helium and the like. During the step of purging the inert gas, the reaction mixture may be continued to be heated to temperatures of about 80° C. to about 150° C., about 90° C. to about 150° C., about 100° C. to about 150° C. or about 120° C. to about 150° C. Specific examples include about 80° C., about 90° C., about 95° C., about 100° C., about 110° C., about 120° C., about 125° C., about 130° C., about 140° C., about 150° C. and ranges between any two of these values. This heating step may be performed for about 1 hour to about 48 hours, for about 5 hours to about 48 hours, for about 10 hours to about 48 hours, for about 24 hours to about 48 hours. Specific examples include about 1 hour, about 2 hours, about 4 hours, about 8 hours, about 12 hours, about 24 hours, about 48 hours and ranges between any two of these values. The resulting product is a "pre-activated" catalyst that may be used for alkyne metathesis reactions.

Figure 2:
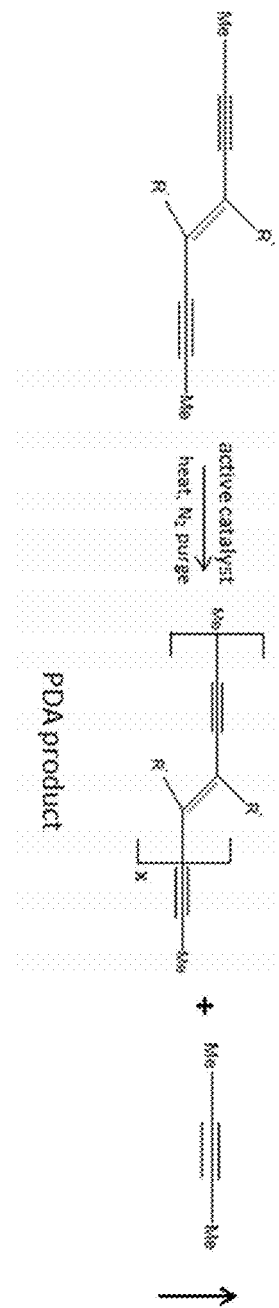
FIG. 2 depicts formation of polydiacetylenes by alkyne metathesis reaction according to an embodiment.

The catalyst describe herein may be used in the synthesis of PDAs, as illustrated by FIG. 2. PDA synthesis involves performing a metathesis reaction with the substrate enediyne and the catalyst in a reaction vessel in the presence of a continuous flow of an inert gas. A typical reaction mixture may involve the following composition: at least one enediyne substrate, at least one catalyst and a polydiacetylene product, wherein the catalyst is represented by the formula:

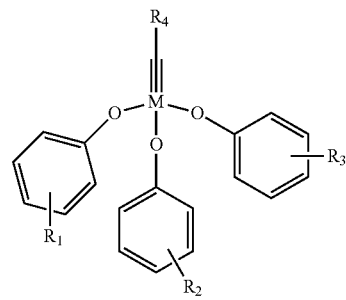

wherein M is molybdenum or tungsten; $R_1$, $R_2$, and $R_3$ are, independently, a perfluoroalkyl group represented by the formula —$(CF_2)_nF$; n is an integer from 1 to 24; F represents fluorine and $R_4$ is an alkyl or a heteroalkyl group.

The PDA synthesis may be performed in the same vessel where the catalyst was synthesized by adding the enediyne substrate to the reaction mixture and continuing the reaction. Alternatively, the reaction may be performed in a fresh reaction vessel by introducing the enediyne substrate and the catalyst. The catalyst disclosed herein may be used in combination with any other alkyne metathesis catalysts for synthesis of PDAs. Examples of other alkyne metathesis catalysts may include catalysts belonging to the Mortreux system, the Schrock system, or the Cummins-Fürstner-Moore system.

The reactions are performed such that the substrates are contacted with the homogeneous or heterogeneous catalyst. This is often effected by mixing a solution or suspension of the substrate with a solution or suspension of the catalyst. An enediyne substrate that may be used for polymerization is represented by the formula (III):

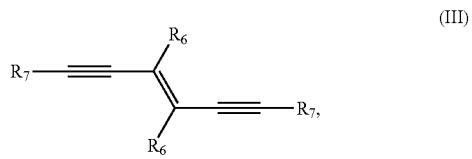

(III)

In some embodiments, $R_6$ may be hydrogen, alkyl, substituted alkyl, alkoxy, substituted alkoxy, aryl, substituted aryl, heteroaryl, substituted heteroaryl, substituted amino, alkylamino, substituted alkylamino, azido, nitro, nitroso, cyano, thioether, aldehyde, carboxyl, sulfoalkyl, carboxyalkyl or amino alkyl. In other embodiments, $R_7$ may be hydrogen, alkyl, substituted alkyl, alkoxy, substituted alkoxy, sulfoalkyl, carboxyalkyl or amino alkyl. Further, any number of different stereoisomers of enediynes may be used in the reaction.

The polymerization of enediynes through alkyne metathesis may be carried out in a reaction vessel as described herein.

Enediynes dissolved in o-dichlorobenzene or a similar high-boiling solvent may be used at this step. In some embodiments, the enediyne and the catalyst are heated to temperatures of about 80° C. to about 130° C., about 90° C. to about 130° C., about 100° C. to about 130° C. or about 120° C. to about 130° C. Specific examples include about 80° C., about 90° C., about 95° C., about 100° C., about 110° C., about 120° C., about 125° C., about 130° C., and ranges between any two of these values. This heating step may be performed for about 1 hour to about 48 hours, for about 5 hours to about 48 hours, for about 10 hours to about 48 hours, or for about 24 hours to about 48 hours. Specific examples include about 1 hour, about 2 hours, about 4 hours, about 8 hours, about 12 hours, about 24 hours, about 48 hours, and ranges between any two of these values. During the process, the reaction mixture may be purged with an inert gas as described herein.

The catalyst may catalyze metathesis of alkynes in solution or in the gas phase. When used with alkynes in solution, the catalytic reaction may be driven to produce a selected product by removal of a competing by-product. For example, the by-product may be removed from the solution in a gaseous state by vacuum or gas purging. If the by-product is insoluble in the solution, it may be removed by precipitation to drive the reaction to the desired product.

The PDA product may be obtained after the alkyne metathesis reaction by cooling the mixture gradually. This may be performed by cooling the reaction mixture, for example, at the rate of about 1° C. per minute to about 5° C. per minute. The mixture may be further diluted with an organic solvent, such as chloroform or dichloromethane. The organic phase of the mixture may be washed successively by a basic solution, an acidic solution and water. The basic solution may be, without limitation, about 10% NaOH, about 10% KOH, about 10% NH$_4$OH, or any of the group 1A and 2A metal hydroxides. Non-limiting examples of acidic solutions that may be used are HCl, H$_2$SO$_4$, HNO$_3$, HClO$_4$, HBr, acetic acid and the like. After washing, the PDA polymer may be precipitated by adding a non-solvent. The precipitate may be purified to remove traces of catalyst or other phenol additives. The recovery of the reaction mixtures and the purification of the products may be achieved in a number of ways and depends on the respective physical properties of the produced products and/or the unreacted substrates. Preferred recovery and purification methods are distillation, sublimation, crystallization, chromatography, filtration, and Soxhlet-type extraction, by using a progression of solvents ranging from complete non-solvents for the PDAs to good solvents for the PDAs.

EXAMPLES

Example 1

Preparation of an Enediyne Monomer

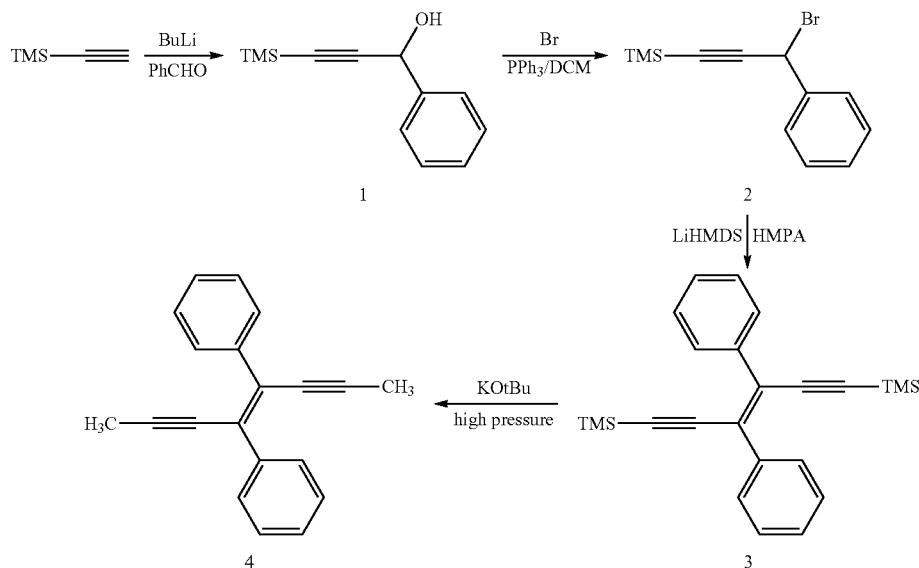

Trimethylsilyl acetylene (20.79 grams, 0.210 moles) was dissolved in dry diethyl ether at −78° C. Butyllithium (BuLi) (100 ml of a 2M solution, 0.200 moles) was then added to the above solution over fifteen minutes. Benzaldehyde (PhCHO) (19.08 grams, 0.180 moles) was added, and the solution was warmed to room temperature over several hours. The reaction mixture was quenched with an acid followed by extraction with ether. Finally, the solvent was removed in vacuo to obtain compound 1 as a yellow oil (34.50 grams, 93.5%).

Triphenylphosphine (PPh$_3$) (1.41 grams, 0.055 mol) was dissolved in 50 ml of dry dichloromethane (DCM) under N$_2$, and cooled to 0° C. Bromine (8.8 grams, 0.055 mol) was then added dropwise to the above solution over ten minutes, resulting in a colorless suspension. After fifteen minutes of additional reaction time at 0° C., compound 1 (10.25 grams, 0.05 mol) was added, and the mixture was warmed to room temperature over several hours. Further, hexane was added to the above mixture to precipitate triphenylphosphine oxide. The precipitate was filtered through a plug of "deactivated" silica gel (normal silica that had been previously washed with a 10% ethylamine/hexane solution), and the solvent was removed in vacuo to obtain compound 2 as a red oil (9.50 grams, 70.9%).

Hexamethyldisilazane (HMDS) (6.9 ml) was dissolved in dry tetrahydrofuran (THF) under nitrogen in an oven-dried Schlenk flask (250 ml). The flask was cooled to −10° C. in a salt/ice bath. BuLi (33 mmol) was then added dropwise over 10 minutes, and the mixture was stirred for an additional 20 minutes at −10° C. Hexamethylphosphoramide (HMPA) (5.76 ml) was then added to the mixture. Meanwhile, in a second oven-dried Schlenk flask, compound 2 (8.04 grams, 30.0 mmol) was dissolved in dry THF and cooled to −78° C. The base mixture from the first flask was slowly added over 2 hours via positive pressure cannula, to obtain a deep green solution. After an additional 15 minutes at −78° C., the mixture was quenched with saturated $NH_4Cl$ (30 ml) and extracted with ether. The solvent was removed in vacuo to obtain a crude brown solid. The solid was washed with cold MeOH followed by recrystallization to obtain compound 3 (1.670 grams, 29.6%).

An oven-dried high pressure glass tube was charged with compound 3 (5.00 grams, 13.37 mmol), potassium t-butoxide (KOtBu) (3.68 grams, 40 mmol), and dry THF (20 ml) under nitrogen. The mixture was stirred at 25° C. for 30 minutes, and methyl iodide (28.60 grams, 200 mmol) was added via syringe and the tube was sealed with a Teflon cap. The mixture was heated to 80° C. for 2 days. The mixture was later cooled, quenched with water and extracted with ethyl acetate. The organic solvent was later removed in vacuo to obtain a crude yellow solid. This was further purified by flash chromatography to yield pure white crystals of compound 4 (1E)-2-phenyl-1-prop-1-ynylpent-1-en-3-ynyl)benzene (2.33 grams, 68%). $^1H$ NMR: δ 7.80-7.83 (m, 8H), 7.26-7.38 (m, 12H), 1.93 (s, 6H). $^{13}C$ NMR: δ 139.75, 128.93, 128.92, 128.90, 127.98, 127.75, 127.63, 94.85, 80.60, 4.85.

Example 2

Preparation of a Catalyst—Catalyst 1

A 30 mL cylindrical high-pressure thick glass tube (dried overnight in an oven) was charged under $N_2$ at room temperature with $Mo(CO)_6$ (0.1 mmol) and freshly prepared 4-per fluorooctylphenol (3 mmol) in o-dichlorobenzene (3 ml). 2-Butyne (3 mmol) was added to the above mixture, and the tube was sealed with a Teflon cap/rubber gasket. The mixture was heated to 130° C. for 2 hours. The cap was removed and replaced with an upside-down rubber septum, which was secured around the outer part of the glass tube with copper wire to form a seal. A 20 gauge syringe needle was inserted through the septum to serve as a gas outlet, and a slow stream of $N_2$ was introduced via cannula, bubbling $N_2$ through the solution phase. The mixture was further heated at 130° C. for 1 hour to drive off excess 2-butyne and to obtain a pre-activated catalyst.

Example 3

Preparation of a Catalyst—Catalyst 2

A 30 mL cylindrical high-pressure thick glass tube (dried overnight in an oven) is charged under $N_2$ at room temperature with $Mo(CO)_6$ (0.1 mmol) and freshly prepared 4-per fluorododecyl phenol (3 mmol) in o-dichlorobenzene (3 ml). 2-Pentyne (3 mmol) is added to the above mixture, and the tube is sealed with a Teflon cap/rubber gasket. The mixture is heated to 130° C. for 2 hours. The cap is removed and replaced with an upside-down rubber septum, which is secured around the outer part of the glass tube with copper wire to form a seal. A 20 gauge syringe needle is inserted through the septum to serve as a gas outlet, and a slow stream of $N_2$ is introduced via cannula, bubbling $N_2$ through the solution phase. The mixture is further heated at 130° C. for 1 hour to drive off excess 2-pentyne and to obtain a pre-activated catalyst.

Example 4

Alkyne Metathesis Reaction

A 30 mL cylindrical high-pressure thick glass tube (dried overnight in an oven) was charged under $N_2$ at room temperature with $Mo(CO)_6$ (0.1 mmol) and freshly prepared 4-per fluorododecyl phenol (3 mmol) in o-dichlorobenzene (3 ml). 2-Butyne (3 mmol) was added to the above mixture, and the tube was sealed with a Teflon cap/rubber gasket. The mixture was heated to 130° C. for 2 hours. The cap was removed and replaced with an upside-down rubber septum, which was secured around the outer part of the glass tube with copper wire to form a seal. A 20 gauge syringe needle was inserted through the septum to serve as a gas outlet, and a slow stream of $N_2$ was introduced via cannula, bubbling $N_2$ through the solution phase. The mixture was further heated at 130° C. for 1 hour to drive off excess 2-butyne. Compound 4 of EXAMPLE 1 (3 mmol) dissolved in 0.5 mL o-dichlorobenzene was added via syringe, and the heating was continued at 130° C. for 24 hours with a constant $N_2$ purge. A dark brown solution obtained was cooled and further diluted with $CHCl_3$. The organic phase was washed with 10% NaOH, 10% HCl, and $H_2O$, followed by the addition of MeOH to obtain PDA polymer precipitate. The polymer was filtered using a glass frit filter and washed with fresh MeOH to remove traces of catalyst residue and phenol additives.

Example 5

Alkyne Metathesis Reaction

A 30 mL cylindrical high-pressure thick glass tube (dried overnight in an oven) is charged under $N_2$ at room temperature with $Mo(CO)_6$ (0.1 mmol) and freshly prepared 4-per fluorododecyl phenol (3 mmol) in o-dichlorobenzene (3 ml). 2-butyne (3 mmol) is added to the above mixture, and the tube is sealed with a Teflon cap/rubber gasket. The mixture is heated to 130° C. for 2 hours. The cap is removed and replaced with an upside-down rubber septum, which is secured around the outer part of the glass tube with copper wire to form a seal. A 20 gauge syringe needle is inserted through the septum to serve as a gas outlet, and a slow stream of $N_2$ is introduced via cannula, bubbling $N_2$ through the solution phase. The mixture is further heated at 130° C. for 1 hour to drive off excess 2-butyne. (4E)-4-decyl-5-methyloct-4-ena-2,6-diyne (3 mmol) dissolved in 0.5 mL o-dichlorobenzene is added via syringe, and the heating is continued at 130° C. for 24 hours with a constant $N_2$ purge. The solution obtained is cooled and further diluted with $CHCl_3$. The organic phase is washed with 10% NaOH, 10% HCl, and $H_2O$, followed by the addition of MeOH to obtain PDA polymer precipitate. The polymer is filtered using a glass frit filter and washed with fresh MeOH to remove traces of catalyst residue and phenol additives.

Example 6

Comparison of Catalysts

Figure 3:
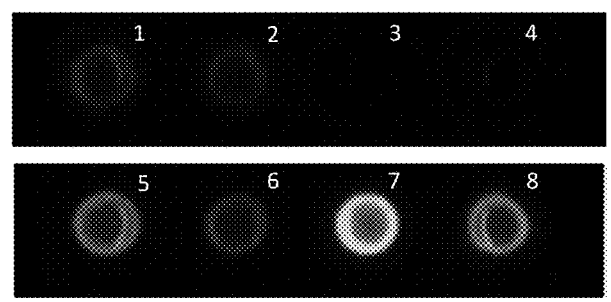
FIG. 3 demonstrates the efficiency of various catalysts in polymerizing a dipropynyl dialkyl benzene monomer according to an embodiment.

The catalytic efficiency of the various phenols in combination with $Mo(CO)_6$ were evaluated. A monomer, 1,4-dipropyl-2,5-didodecyl benzene, was used for the polymerization and a series of reactions were performed in a ceramic well plate using the above mentioned catalysts. Each well contained a few milliliters of o-dichlorobenzene, the above monomer, a few crumbles of $Mo(CO)_6$ and a few crystals of various phenols with different phenol in each well (well 1, 4-fluorophenol; well 2, 4-nitrophenol; well 3, 2-methoxyphenol; well 4, 4-methoxyphenol; well 5, 4-chlorophenol; well 6, phenol; well 7: 4-perfluorooctylphenol; well 8, 4-bromophenol). The plate was placed in a forced air oven at 100° C. for several hours and the resulting monomer conjugates were quantified by visualizing under UV light. As shown in FIG. 3, $Mo(CO)_6$ and 4-perfluorooctylphenol (well 7) produced the most extensively conjugated material, as visualized under UV irradiation, and thus was directly correlated to the degree of polymerization.

Example 7

Comparison of Catalysts

Enediyne polymerizations are performed to evaluate different molybdenum-phenol catalysts. Compound 4 ((1E)-2-phenyl-1-prop-1-ynylpent-1-en-3-ynyl)benzene) is used as a monomer in the alkyne metathesis reaction in the presence of different catalytic mixtures [$Mo(CO)_6$ and 2-fluorophenol, $Mo(CO)_6$ and 4-fluorophenol, $Mo(CO)_6$ and 4-perfluoro octylphenol]. The $Mo(CO)_6$ and 4-perfluorooctylphenol catalytic mixture will produce higher yields of PDAs when compared to the others.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A chemical compound having a structural formula I:

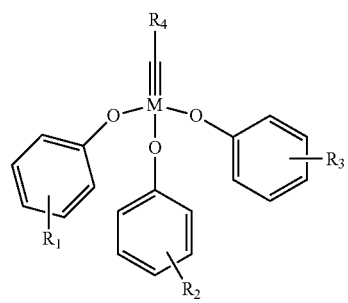

(I)

wherein M is molybdenum or tungsten;
$R_1$, $R_2$, and $R_3$ are, independently, a perfluoroalkyl group represented by the formula —$(CF_2)_nF$;
n is an integer from 2 to 24; and
$R_4$ is an alkyl or a heteroalkyl group.

2. The chemical compound of claim 1, wherein $R_4$ is a methyl group, an ethyl group, a propyl group, a n-butyl group, an iso-butyl group, a pentyl group, a hexyl group, a heptyl, or an octyl group.

3. The chemical compound of claim 1, wherein the perfluoroalkyl is perfluorohexyl, perfluorooctyl, perfluoropentyl, perfluorododecyl, perfluoromethyldecyl or a combination thereof.

4. The chemical compound of claim 1, wherein the perfluoroalkyl is 4-perfluorooctyl, 4-perfluorododecyl, 4-perfluorohexyl, or a combination thereof.

5. A method for preparing a catalyst, the method comprising:
heating a reaction mixture comprising a transition metal compound, a perfluoroalkyl phenol, and an alkyne in a reaction vessel; and
removing the alkyne by purging with an inert gas.

6. The method of claim 5, wherein heating the reaction mixture comprises heating perfluoroalkyl phenol and the alkyne with at least one transition metal selected from $Mo(CO)_6$ and or $W(CO)_6$.

7. The method of claim 5, wherein heating the reaction mixture comprises heating the transition metal compound, the alkyne, and the perfluoroalkyl phenol represented by the structure:

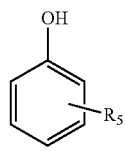

wherein $R_5$ is represented by the formula —$(CF_2)_nF$, where n is an integer from 1 to 24.

8. The method of claim 5, wherein heating the reaction mixture comprises heating the transition metal compound, alkyne, and at least one perfluoroalkyl phenol selected from the group consisting of perfluorohexyl phenol, perfluorooctyl phenol, perfluoropentyl phenol, perfluorooctyl n-propyl phenol, perfluorododecyl phenol and perfluoromethyldecyl phenol.

9. The method of claim 5, wherein heating the reaction mixture comprises heating the transition metal compound, the perfluoroalkyl phenol, and at least one alkyne selected from 2-butyne or 2-pentyne.

10. The method of claim 5, wherein heating the reaction mixture comprises heating the reaction mixture formed by mixing the transition metal compound, the perfluoroalkyl phenol, and the alkyne in a molar ratio of about 0.1:1:1 to about 0.25:5:10.

11. A method of preparing a polydiacetylene, the method comprising:
providing at least one enediyne substrate and at least one catalyst; and
performing a metathesis reaction with the at least one enediyne substrate and the at least one catalyst in a reaction vessel to produce the polydiacetylenes.

12. The method of claim 11, wherein performing the metathesis reaction with the at least one enediyne substrate and the at least one catalyst comprises performing the reaction in a solution phase in a reaction vessel.

13. The method of claim 11, wherein providing at least one enediyne substrate comprises providing the at least one enediyne substrate represented by the formula:

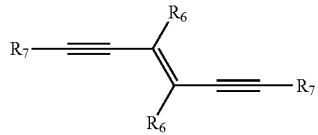

wherein $R_6$ is selected from the group consisting of hydrogen, alkyl, substituted alkyl, alkoxy, substituted alkoxy, aryl, substituted aryl, hetero aryl, substituted heteroaryl, substituted amino, alkylamino, substituted alkylamino, azido, nitro, nitroso, cyano, thioether, aldehyde, carboxyl, sulfoalkyl, carboxyalkyl and amino alkyl; and $R_7$ is selected from the group consisting of hydrogen, alkyl, substituted alkyl, alkoxy, substituted alkoxy, sulfoalkyl, carboxyalkyl and amino alkyl.

14. The method of claim 11, wherein providing at least one catalyst comprises providing the at least one catalyst represented by the formula I:

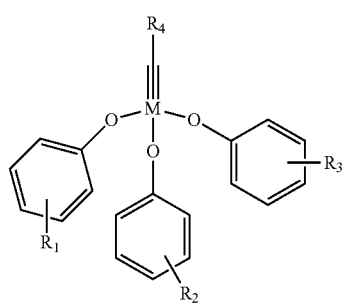

(I)

wherein M is molybdenum or tungsten;

$R_1$, $R_2$ and $R_3$ are, independently, a perfluoroalkyl group represented by the formula $-(CF_2)_nF$;

n is an integer from 2 to 24; and $R_4$ is an alkyl or a heteroalkyl group.

15. The method of claim 14, wherein providing at least one catalyst comprises providing the catalyst of formula (I) wherein the perfluoroalkyl is perfluorohexyl, perfluorooctyl, perfluoropentyl, perfluorododecyl or perfluoromethyldecyl.

16. The method of claim 14, wherein providing at least one catalyst comprises providing the catalyst of formula (I) wherein $R_4$ is a methyl group, an ethyl group, a propyl group, a n-butyl group, an iso-butyl group, a pentyl group, a hexyl group, a heptyl, or an octyl group.

17. The method of claim 11, wherein performing the metathesis reaction comprises heating the at least one enediyne substrate and the at least one catalyst in a reaction vessel at about 80° C. to about 130° C.

18. The method of claim 17, wherein performing the metathesis reaction further comprises passing a continuous flow of an inert gas while heating the at least one enediyne substrate and the at least one catalyst.

19. The method of claim 11, wherein performing the metathesis reaction comprises heating the at least one enediyne substrate and the at least one catalyst for about 1 hour to about 48 hours.

20. The method of claim 17, wherein performing the metathesis reaction further comprises cooling a reaction mixture of the at least one enediyne substrate and the at least one catalyst to room temperature.

21. The method of claim 20, wherein performing the metathesis reaction further comprises diluting the reaction mixture with any of the following: chloroform or dichloromethane.

22. The method of claim 21, wherein diluting the reaction mixture further comprises washing the reaction mixture with a basic solution, followed by washing the reaction mixture with an acidic solution and followed by washing the reaction mixture with water.

23. The method of claim 22, further comprising filtering a precipitate.

24. A composition comprising:
at least one catalyst and one or more of the following: at least one enediyne substrate or at least one polydiacetylene product,
wherein the at least one catalyst is represented by the formula

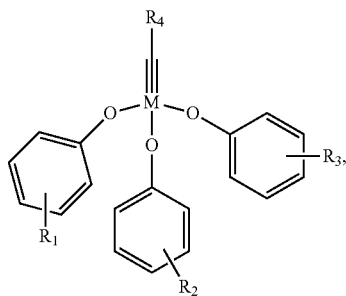

where M is molybdenum or tungsten;

$R_1$, $R_2$ and $R_3$ are, independently, a perfluoroalkyl group represented by the formula $-(CF_2)_nF$;

n is an integer from 2 to 24; and $R_4$ is an alkyl or a heteroalkyl group.

25. The composition of claim 24, wherein the composition comprises a mixture of the at least one enediyne substrate, the at least one catalyst and the at least one polydiacetylene product.

* * * * *

UNITED STATES PATENT AND TRADEMARK OFFICE
CERTIFICATE OF CORRECTION

| | | |
|---|---|---|
| PATENT NO. | : 8,946,364 B2 | Page 1 of 1 |
| APPLICATION NO. | : 13/817008 | |
| DATED | : February 3, 2015 | |
| INVENTOR(S) | : Brizius et al. | |

It is certified that error appears in the above-identified patent and that said Letters Patent is hereby corrected as shown below:

In the Claims

In Column 14, Line 10, in Claim 6, delete "and or" and insert -- or --, therefor.

Signed and Sealed this
Twenty-eighth Day of July, 2015

Michelle K. Lee
*Director of the United States Patent and Trademark Office*